United States Patent [19]

Jones et al.

[11] 3,953,227
[45] Apr. 27, 1976

[54] ELECTROCHEMICAL CELLS HAVING A LIQUID ALKALI METAL ELECTRODE AND SOLID ELECTROLYTE

[75] Inventors: Ivor Wynn Jones; Lyndon James Miles, both of Chester; Graham Robinson, Tarvin, all of England

[73] Assignee: The Electricity Council, London, England

[22] Filed: Sept. 20, 1974

[21] Appl. No.: 508,006

Related U.S. Application Data

[63] Continuation of Ser. No. 477,937, June 10, 1974, abandoned, which is a continuation-in-part of Ser. No. 430,363, Jan. 2, 1974.

[30] Foreign Application Priority Data

Jan. 3, 1973    United Kingdom.................. 396/73

[52] U.S. Cl. ............................... 136/6 FS; 136/20; 136/83 R; 136/153
[51] Int. Cl.² ....................................... H01M 10/00
[58] Field of Search............ 136/6 FS, 6 F, 20, 83 R, 136/153

[56] References Cited
UNITED STATES PATENTS

| | | | |
|---|---|---|---|
| 3,413,150 | 11/1968 | Kummer et al..................... | 136/6 FS |
| 3,514,332 | 5/1970 | Minck ............................... | 136/6 FS |
| 3,758,337 | 9/1973 | Fally et al.......................... | 136/6 FS |
| 3,770,502 | 11/1973 | Nakabayashi ..................... | 136/6 FS |
| 3,837,918 | 9/1974 | Nakabayashi ..................... | 136/6 FS |
| 3,841,912 | 10/1974 | Kagawa............................. | 136/6 FS |
| 3,883,367 | 5/1975 | Chiku et al. ...................... | 136/20 X |

Primary Examiner—G. L. Kaplan
Assistant Examiner—C. F. Lefevour
Attorney, Agent, or Firm—Beveridge, DeGrandi, Kline & Lunsford

[57] ABSTRACT

In an electrochemical cell, such as a sodium-sulphur cell, having a liquid metal electrode and a solid electrolyte, the solid electrolyte is an upright tube with a closed end and a reservoir is provided above the top of the electrolyte tube to accommodate the increased volume of the cathodic reactant as the cell discharges whereby the whole surface of the electrolyte can be in contact with the cathodic reactant despite the increase in volume of the cathodic reactant in the cathodic compartment.

11 Claims, 3 Drawing Figures

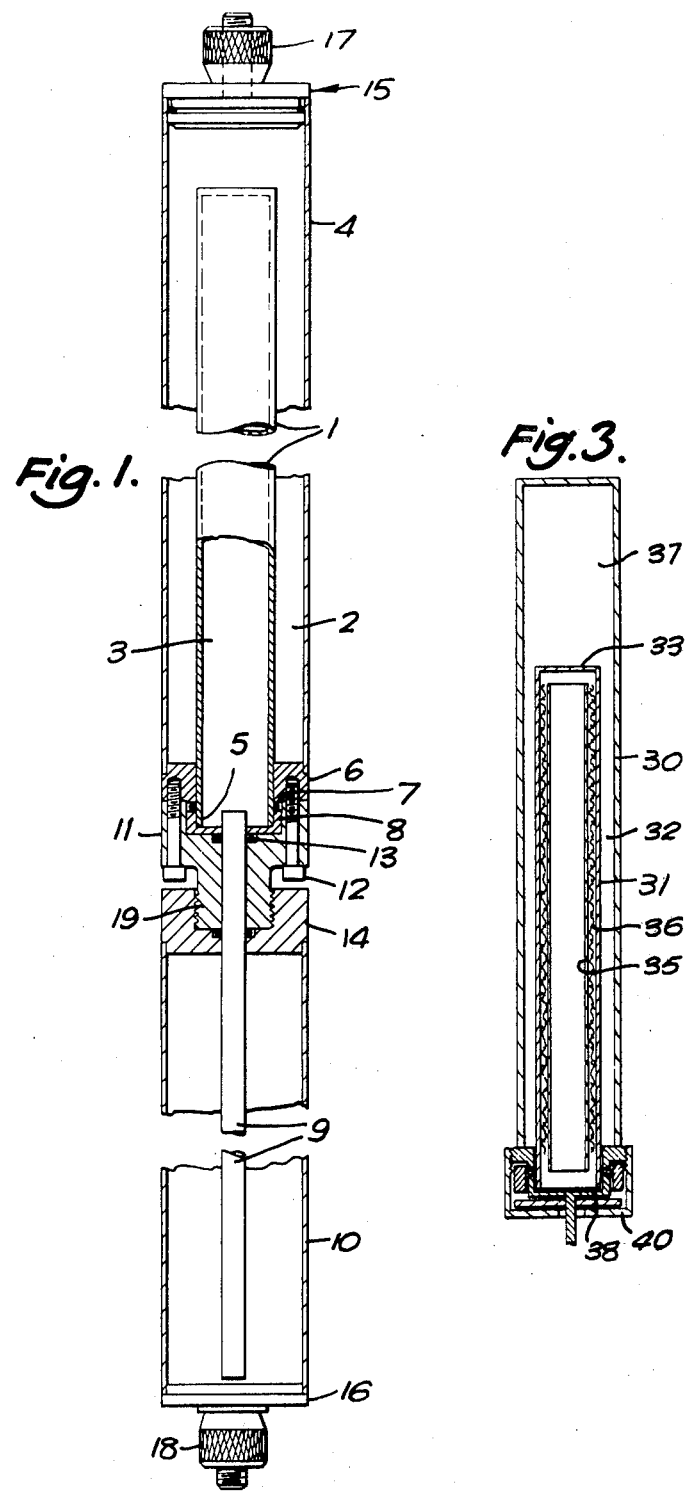

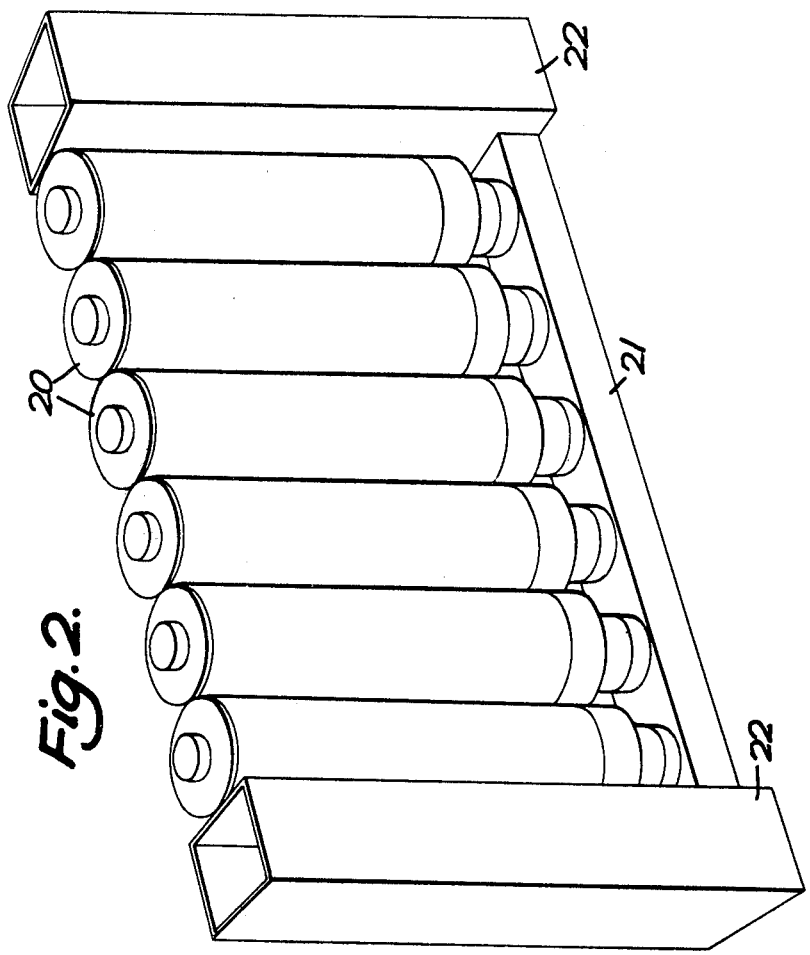

ELECTROCHEMICAL CELLS HAVING A LIQUID ALKALI METAL ELECTRODE AND SOLID ELECTROLYTE

RELATED APPLICATIONS

This continuing application claims the benefit of the filing dates of U.S. patent applications Ser. No. 477,937 filed June 10, 1974, by I. W. Jones, L. J. Miles and G. Robinson, now abandoned, which is a continuation-in-part of Ser. No. 430,363 filed Jan. 2, 1974, by G. Robinson and I. W. Jones, both of the disclosures and specifications of which are hereby incorporated by reference.

BACKGROUND OF THE INVENTION

1. Field of the invention

This invention relates to electrochemical cells having a liquid alkali metal electrode. Such a cell makes use of a suitable cathodic reactant and has, between the alkali metal and cathodic reactant, a solid electrolyte in a form of a ceramic element, e.g. a membrane, that conducts ions of the alkali metal. A typical example of such a cell is a sodium-sulfur cell having a $\beta$-alumina ceramic membrane forming the electrolyte.

2. Prior Art

When such a cell with a liquid alkali metal electrode and ceramic membrane is passing current, electrons flow from the alkali metal forming the anode to the cathodic reactant through the external circuit. Positive ions of the alkali metal pass through the ceramic and combine with the negative ions of the reactant. The effect of discharging the cell is therefore to cause the alkali metal to pass through the ceramic membrane constituting the electrolyte. The main limitation to the power that can be derived from such a cell is the resistance of the ceramic membrane and this is inversely proportional to the area in contact with the alkali metal and with the cathodic reactant. Thus, if during discharge of the cell, the alkali metal level falls as the alkali metal passes through the electrolyte, then the effective area of alkali metal in contact with the electrolyte decreases progressively causing a rapid increase in resistance. Apart from the loss of power so caused, the concentration of current flow through the decreasing area of ceramic may damage the ceramic membrane. For this reason therefore it has heretofore been considered necessary to include in the reservoir holding the alkali metal required for the reaction enough alkali metal to maintain the required level in contact with the electrolyte when the reaction is complete. This extra alkali metal, which does not contribute to the electrochemical process, is typically about one third of the total alkali metal.

Similarly, it is also necessary, for efficient operation, to keep the cathode surface of the electrolyte covered by the cathodic reactant. As the cell discharges and the alkali metal passes through the electrolyte, the volume of the cathodic reactant increases. The cathodic reactant would normally be within an annular region between the electrolyte surface and a current collector; it is desirable to keep the current path between the electrolyte and current collector as short as possible. However provision must be made to accommodate the increased volume of cathodic reactant as the cell discharges.

Quite apart from the utilisation of the total amount of alkali metal, it is not possible to increase the capacity of the cell in relation to the weight of alkali metal used, and power density by increasing the size of the effective electrode chamber in the cell. This may readily be seen by considering a cell having an electrode formed by a tube with the alkali metal inside the tube and the cathodic reactant outside the tube. If the power of the cell is increased by increasing the diameter of the ceramic tube, the surface area of the tube (and hence the power) increases linearly with increasing tube diameter but the weight of the unused alkali metal necessary to maintain the tube full would increase quadratically with increase of tube diameter.

SUMMARY OF THE INVENTION

It is an object of the present invention to provide an improved form of cell having a liquid alkali metal electrode and a cathodic reactant separated by a solid electrolyte tube in which the area of electrolyte in contact with the cathodic reactant can be maintained despite the charges in volume of the cathodic reactant consequent upon the passage of the alkali metal through the electrolyte.

According to this invention, an electrochemical cell having an upright solid electrolyte tube within a tubular housing with a liquid alkali metal adjacent one face and a cathodic reactant adjacent the other face is characterised in that the electrolyte tube is closed at one end and in that the cathodic reactant-containing region is open at its upper end to a cathodic reactant reservoir above the top of the electrolyte tube. With this construction, the reservoir at the upper end accommodates the increased volume of the cathodic reactant as the cell discharges. The cell is initially filled with cathodic reactant such that, when fully charged, the level of the cathodic reactant is at or just above the top of the electrolyte tube; thus the whole or substantially the whole of one surface of the electrolyte is always in contact with the cathodic reactant.

The electrolyte tube might be closed at its lower end with the cathodic reactant inside the tube and the alkali metal outside the tube in the annular region between the tube and the housing, an alkali metal reservoir being provided at one end of the assembly. Preferably, however, the electrolyte tube is closed at its upper end with the alkali metal within the tube and the cathodic reactant on the outside of the tube. The housing may comprise a metal tube constituting a cathode electrical connection. The metal must be such that it will not react chemically with the cathodic reactant and conveniently stainless steel is used in the case of a sodium/sulphur cell.

Means may be provided to maintain the alkali metal in contact with the whole of said one face of the electrolyte tube. In a construction with a reservoir for the alkali metal, these means may comprise gas in said reservoir as pressurising means for forcing the alkali metal from said alkali metal reservoir into the region adjacent the electrolyte. Alternatively capillary means may be provided constituted by a narrow spacing between the electrolyte tube and another element, e.g. a metal conductor for effecting electrical connection to the alkali metal or by porous or fibrous or other material forming a wick.

An elastomeric sealing ring may be provided around said electrolyte tube near the open end thereof sealing said housing to the tube and forming also a seal between the tube and closure means over the open end of the tube.

The use of an elastomeric member not only provides an efficient seal but also provides a seal which in general is unaffected by the relative movement of the adjacent cell parts during cycles in which the temperature of those parts rises and falls.

In a preferred construction of cell the open end of the electrolyte tube protrudes from an opening in said housing. This facilitates the localisation of any gradient between the temperature of the cell and the temperature of a reservoir connected to the electrolyte tube. In this construction the elastomeric ring may be disposed around the electrolyte tube between its end and the said opening. Preferably the elastomeric ring is pressed into contact with the electrolyte tube and with the outer housing adjacent where the electrolyte tube protrudes from the outer housing.

BRIEF DESCRIPTION OF THE DRAWINGS

FIG. 1 illustrates one embodiment of a cell in accordance with the invention;

FIG. 2 illustrates a convenient arrangement of an array of cells as shown in FIG. 1; and FIG. 3 is a diagrammatic section of another construction of sodium-sulphur cell.

DESCRIPTION OF THE PREFERRED EMBODIMENTS

In the cell shown in FIG. 1 a tube 10 with closed ends forms a solid electrolyte membrane 1 between liquid electrodes 2 and 3. The tube is 10 to 40 cm long, with an outside diameter between one and two cm and a wall thickness 0.5 to 2 mm. The membrane 1 is of beta-alumina ceramic material and functions as a solid electrolyte permitting the passage of sodium ions. The sulphur electrode 2 is in a container or housing 4 constructed from thin-walled tubing and is approximately one and a half times as long as the membrane 1. The annulus between the membrane 1 and the tubular container 4 is packed with graphite felt of 95% porosity and filled with sulphur. Thus, the container 4 also acts as a current collector for the sulphur electrode.

The container 4 is constructed of a material, e.g. a stainless steel having a high chromium content, which is resistant to sulphur and sodium sulphides during charge/discharge cycling of the cell.

When the cell is fully charged the surface of the sulphur electrode 2 is level with the upper (closed) end of the tube 1 so that the whole of the outer surface of the electrolyte is covered by the sulphur forming the cathodic reactant. The volume within the container 4 above the closed end of the tube 1 accommodates the excess liquid volume produced when sodium passes through the tube 1 to form sodium polysulphides during discharge. This configuration ensures that one side, namely the outside of that part of the tube which is within the sulphur, is completely immersed in liquid sulphur/or sulphide throughout a cycle of charging and discharging.

The open end 5 of the electrolyte tube 1 protrudes from an end plug 6 for the container 4. An O-ring 7 encircles the tube 1 near its end 5 and is disposed under pressure between the plug 6 and a locking washer 8. A fine bore stainless steel (or aluminium) tube 9 extends through the locking washer into the tube 1 and connects the sodium electrode 3 with a reservoir 10 so that a continuous supply of sodium is available throughout discharge by virtue of the pressure of gas, in the sodium reservoir, in the volume above the liquid level. Thus the inside of the membrane tube 1 is completely in contact with sodium throughout discharge. The reservoir may be constructed from aluminium and/or stainless steel and serves as the other current collector.

Three sides of the circumference of the single O-ring 7 are simultaneously pressed into contact with the end plug 6, the membrane tube 1 and the locking washer 8 by means of a thrust block 11 which is secured to the end plug by screws 12. The O-ring 7 is accordingly totally enclosed. The O-ring 7 and the thrust block 11 are insulators so that there is no short circuiting contact between the liquid electrodes. A further O-ring 13 encircles the tube 9 and is disposed in a groove in the thrust block 11. The reservoir 10 is closed at its inner end by a plate 14. The reservoir 10 and the case 4 are closed at their outer ends by end plates 15 and 16 secured by nuts 17 and 18 respectively. The thrust block has a screw threading 19 engaging with complementary threading on the plate 14.

Mineral and fibre composite materials are suitable for the construction of the thrust block 11. Other temperature-resistant insulating materials may also be suitable. The overall dimensions of the seal are important and the described seal does not place any limitations on the packing density of an array of cells in a battery.

The O-ring seal 7 is required to operate under quite severe conditions, having liquid sulphur in contact with one face and liquid sodium in contact with another at temperatures up to 300° C. The material of the O-ring type seal is an elastomer, because elastomers deform easily to make the initial seal with the application of minimum force. Clearly it is not necessary for maximum elastomeric properties to be maintained indefinitely at high temperatures because once made, the seal is not demounted during the life of the cell. Nevertheless, some elastomeric properties are required to accommodate relative movements of cell components which occur due to thermal cycling of the cell. However, the impermeability and electrical insulation properties must be retained throughout the life of the cell.

Elastomeric sealing materials which satisfy these rather stringent requirements at 300° C may not be available but this design permits satisfactory operation of the cell when the seal temperature is maintained below 300° C, where a wide range of elastomeric materials have acceptable lifetimes in contact with sodium and sulphur. Lives in excess of 3 months at 200° C may be obtained using Viton rubber O-ring. Silicone rubbers and some other elastomers are suitable. The lower limit for the seal temperature is 100° C, below which sodium freezes, causing blockages in the sodium tube. Clearly, there will be a decrease in cell performance as a result of low seal temperatures corresponding to the presence of temperature gradients in the electrolyte and sulphur electrode. Maximum power and energy densities are achieved when the cell is maintained uniformly at the maximum operating temperature. Temperature control is also easier if precise temperature gradients do not have to be maintained.

Electrochemically, the cell operates in the known way: when an external electronic conductor is connected between the sodium and sulphur electrodes, electrons flow from the sodium to the sulphur through that external conductor. The positive sodium ions and negative sulphur ions so formed combine, through passage of sodium ions through the electrolyte to produce sodium sulphide in the sulphur reservoir.

It will be noted that the sulphur storage region is provided without any increase in the diameter of the annular region around the electrolyte. If the sulphur storage space was increased by increasing the diameter, a thicker layer of sulphur would be required giving a higher cell resistance.

However, the cell which has been described readily allows for suitable optimisation of the conflicting requirements of maximum cell output, and the requirements of maximum seal life.

The sulphur electrode complete with sealed-in electrolyte and sodium tube is a compact self-contained unit. It can be screwed into a 1⅛ inches outside diameter sodium reservoir 10 as illustrated in FIG. 1 to give a compact cylindrical cell of cylindrical geometry. An array of these cells can be packed into a compact multi-cell battery system. Alternatively, a set of sulphur electrodes can be connected to a single sodium reservoir. An example is illustrated in FIG. 1, in which there is a linear array of cells 20, namely cells as described with reference to FIG. 1 but without individual reservoirs 10; the cells 20 are screwed into a continuous sodium reservoir 21 fed from tanks 22 at each end of the array.

The cell described is totally enclosed in metal except for a compact seal between electrode compartments in the form of O-ring 7. This is a robust construction, and problems of leads and contacts to the electrodes are minimised.

The cell, by virtue of the seal and the arrangement of electrodes and electrolyte in the case and reservoir, operates with maximum electrolyte surface immersed in both reactants at all stages of charge and discharge. This advantage is maintained when the device is inclined away from the vertical.

The O-ring seal 7 facilitates manufacture and obviates the need for accurate tolerances on dimensions of the electrolyte tube 1, and thereby reduces manufacturing costs.

The elastomeric properties of the seal material accommodate relative movements of cell components which occur during thermal cycling. Thus, matched coefficients of expansion between metal components and ceramic electrolyte, which are sealed together, are therefore not required.

The device can be operated with many different temperature profiles.

Even when the outside diameter of the electrolyte tube 1 is as large as 15 mm the external diameter of the seal in one embodiment has been less than 28.5 mm which was the outside diameter of the electrode compartments.

Thus the external dimensions of the cell are confined within a cylindrical geometry of 28.5 mm outside diameter.

High packing densities achieved with an array of cylinders enhance the energy per unit volume and power per unit volume characteristics of a battery constructed from the cells described in this claim.

The device described can be readily assembled and filled with sodium and sulphur.

The modular design enables single cells and/or single electrolyte units to be replaced independently of the remainder of a large battery unit.

A battery design based on an array of metal cylinders simplifies the heat transfer problems arising from the elevated operating temperature and high power density of traction batteries based on this device.

Referring to FIG. 3 there is shown a sodium-sulphur cell comprising an outer stainless steel tube 30 around a tubular electrolyte 31 of β-alumina ceramic. The annular space 32 between these tubes contains porous graphitic felt and forms a cathodic reactant chamber for the sulphur which is liquid at the operating temperature of 350° C. The electrolyte tube 31 which has a closed upper end 33 contains the liquid sodium. Within the electrolyte tube 31 is a cylinder 35 formed from a sheet of 0.05 mm stainless foil and having about four layers of 300 mesh stainless steel woven cloth 36 which are so wrapped around the cylinder 35 before the cylinder is inserted within the electrolyte tube 31. The foil cylinder 35 tends to unroll and hence presses the cloth 36 into close contact with the inner wall of the electrolyte tube 11.

The outer tube 30 is longer than the electrolyte tube 31 to provide a storage reservoir 37 bove the closed end 33 of the electrolyte tube, which reservoir accommodates the excess volume of cathodic reactant produced when sodium passes through the tube 31 to form sodium polysulphides during discharge.

In assembling the cell, after the electrolyte tube 31 has been filled with sodium, a cap 38 forming a connector is sealed onto the open end of the tube 31. The annular region between the tube 31 and outer cylindrical container 30 is filled with the sulphur and this annular region is sealed by a further cap 40.

The stainless steel cloth 36 against the inner face of the electrolyte tube 31 acts as a wick which, by capillary action, maintains the inner surface of the electrolyte tube 31 wetted with sodium even if the sodium level in the central region within the tube 31 should fall below the level of the top of the electrolyte. The storage reservoir 37 enables the whole of the outer surface of the electrolyte to be covered by the cathodic reactant throughout the discharge. This construction therefore allows the effective surface area of the ceramic tube to be used without any decrease as the cell is discharged. Electrochemically, the cell operates in the known way: when an external electronic conductor is connected between the sodium and sulphur electrodes, electrons flow from the sodium to the sulphur through that external conductor. The positive sodium ions and negative sulphur ions so formed combine, through passage of sodium ions through the electrolyte, to produce sodium sulphide in the sulphur reservoir.

It will be noted that the sulphur storage region is provided without any increase in the diameter of the annular region around the electrolyte 31. If the sulphur storage space was increased by increasing the diameter, a thicker layer of sulphur would be required giving a higher cell resistance.

We claim:

1. A rechargeable electrochemical cell comprising a tubular housing, an upright solid electrolyte tube within said tubular housing, a liquid alkali metal adjacent one face of the electrolyte tube, and a cathodic reactant adjacent the other face of the electrolyte tube, said electrolyte tube being closed at one end and the cathodic reactant-containing reservoir being provided in said housing above the top of the electrolyte tube, a rerservoir for the liquid alkali metal below the electrolyte tube, and gas pressure means for raising the alkali metal from the alkali metal reservoir to lie in contact with the whole of said one face of the electrolyte tube.

2. A cell as claimed in claim 1 wherein the liquid alkali metal is within the electrolyte tube which is closed at its upper end.

3. A cell as claimed in claim 2 wherein said housing comprises a metal tube constituting a cathode electrical connection.

4. A cell as claimed in claim 1 wherein said means comprise a reservoir for the alkali metal having pressurized gas in said reservoir as pressurising means for forcing the alkali metal from said alkali metal reservoir into the region adjacent the electrolyte.

5. A cell as claimed in claim 1 wherein the liquid alkali metal is sodium and the cathodic reactant is sulphur.

6. An electrochemical cell as claimed in claim 1 wherein closure means are provided over the open end of the electrolyte tube and wherein an elastomeric sealing ring is provided around said electrolyte tube near the open end thereof sealing said housing to the tube and forming also a seal between the tube and said closure means over the open end of the tube.

7. An electrochemical cell as claimed in claim 6 wherein the open end of the electrolyte tube protrudes from an opening in said housing and the said elastomeric ring is disposed around the electrolyte tube between its end and the said opening.

8. An electrochemical cell as claimed in claim 7 wherein the elastomeric ring is pressed into contact with the electrolyte tube and with the housing adjacent where the electrolyte tube protrudes from the outer housing.

9. An electrochemical cell as claimed in claim 6 wherein said closure means over the open end of the electrolyte tube comprises a tube constituting the reservoir for the liquid within the tube.

10. A sodium sulphur cell comprising a tubular stainless steel housing closed at one end, a solid electrolyte tube of beta-alumina ceramic closed at one end, said electrolyte tube being co-axially within said tubular housing, closure means incorporating an electrical connector over the open end of the electrolyte tube, sealing the internal region within the electrolyte tube, a closure cap sealing said closure means to said housing at the open end of the housing, said housing being longer than said electrolyte tube to form a sulphur reservoir within said housing between the closed end of said housing and the closed end of said electrolyte tube, a sodium reservoir within said electrolyte tube, and gas pressure means operative to raise sodium from said reservoir for maintaining liquid sodium in contact with substantially the whole inner surface of said electrolyte tube.

11. A sodium sulphur cell comprising an upright tubular housing, a solid electrolyte tube closed at one end, said electrolyte tube being in said housing and coaxial therewith, sealing means around said electrolyte tube adjacent the open end thereof sealing said electrolyte tube to said housing, a first reservoir for the cathodic reactant in said housing above said electrolyte tube, a second reservoir for liquid sodium at least partly below said electrolyte tube, and gas pressure means for raising the sodium from said second reservoir to lie in contact with the whole of one face of the electrolyte tube.

* * * * *